L. RADCLIFF & E. E. KILBY.
ELECTRIC CAR SWITCH.
APPLICATION FILED JUNE 23, 1910.
1,027,898.
Patented May 28, 1912.
2 SHEETS—SHEET 2.
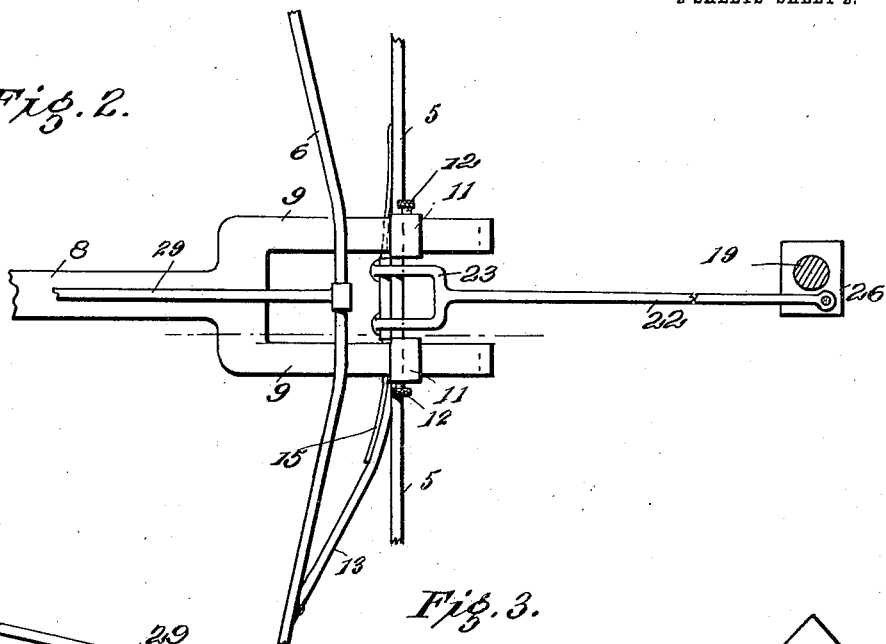
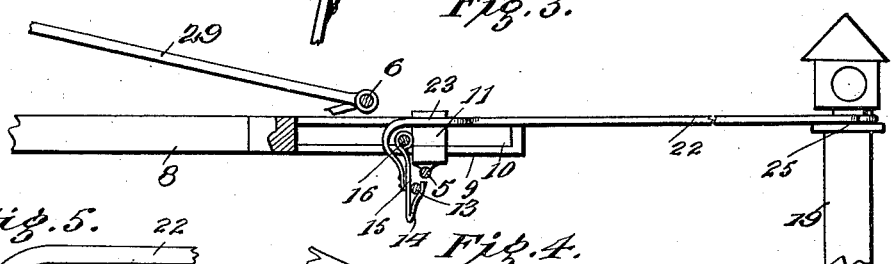
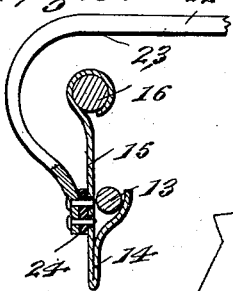
Witnesses
W. N. Woodson
Juana M. Fallin
Inventors
Lee Radcliff and
E. E. Kilby.
By
Attorneys

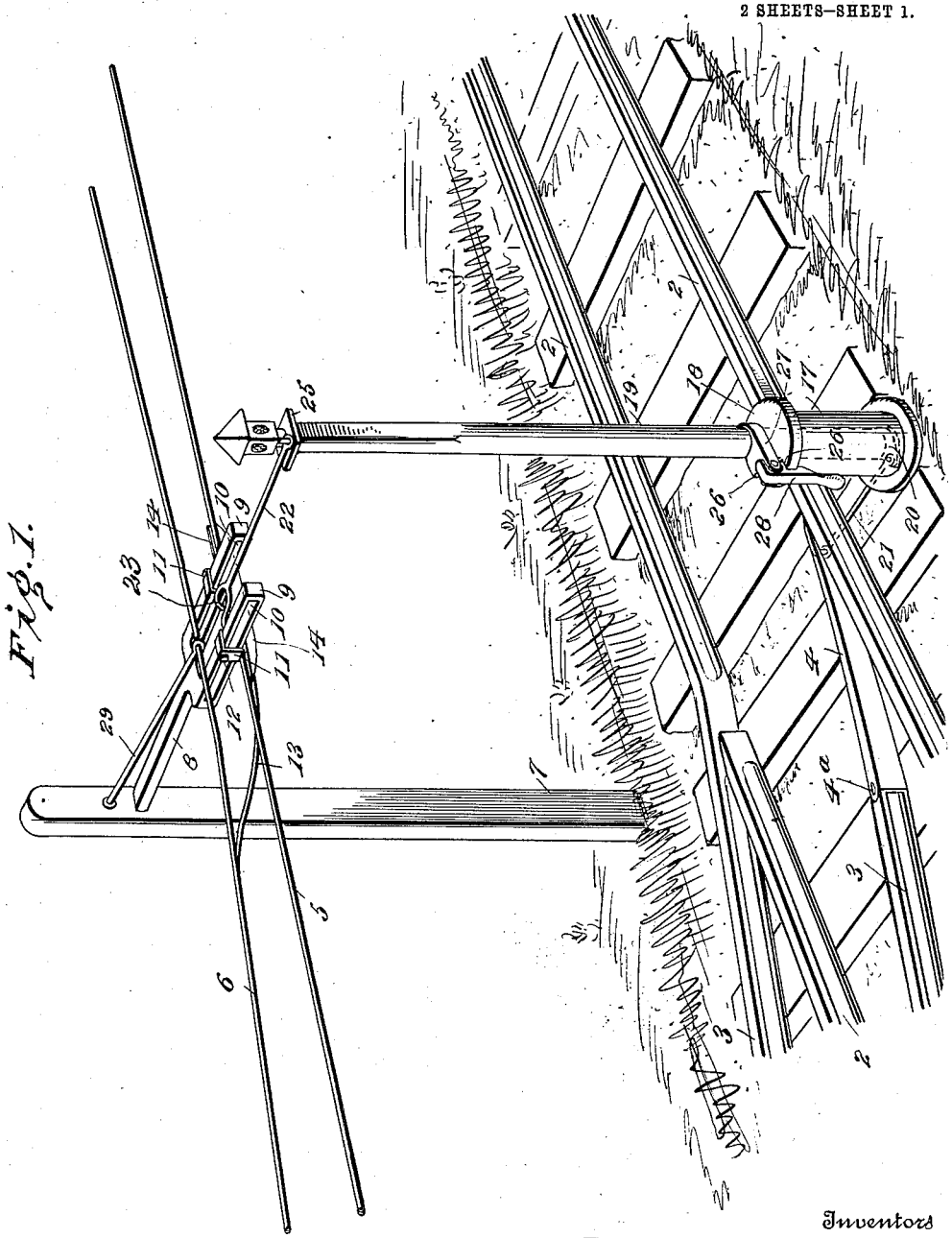

UNITED STATES PATENT OFFICE.

LEE RADCLIFF, OF DANVERS, AND EDGAR E. KILBY, OF MACKINAW, ILLINOIS.

ELECTRIC-CAR SWITCH.

1,027,898.  Specification of Letters Patent.  Patented May 28, 1912.

Application filed June 23, 1910. Serial No. 568,559.

*To all whom it may concern:*

Be it known that we, LEE RADCLIFF and EDGAR E. KILBY, citizens of the United States, residing at Danvers and Mackinaw, respectively, in the counties of McLean and Tazewell, respectively, and State of Illinois, have invented certain new and useful Improvements in Electric-Car Switches, of which the following is a specification.

Our invention relates to switches for electric cars, such as trolley cars, and the object of the invention is to provide a means whereby when the rail switch is thrown a switch shall also be thrown which shall connect the main trolley wire with the side trolley wire, or disconnect it therefrom, thus eliminating the necessity of removing the trolley wheel from the main wire and then replacing the trolley wheel upon the side trolley wire, or vice versa, our invention providing for a switch arrangement whereby when the rail switch is moved the trolley wire switch shall be moved at the same time.

The invention comprises in its general features, a main track and a side track, and a movable switch point for directing the car from the main track to the side track, and vice versa, a main trolley wire, a side trolley wire, and a movable switch point pivoted to the side trolley wire and adapted to be moved to or from the main trolley wire, and in combination therewith a switch stand connected to the rail switch point and to the trolley wire switch point.

Our invention is shown in the accompanying drawings wherein:

Figure 1 is a perspective view of our improved switch. Fig. 2 is a plan view of the support for the line wires and the wire switch. Fig. 3 is a side elevation partly sectional of the same. Fig. 4 is a perspective view showing the parts of the line wire switch disconnected. Fig. 5 is an enlarged detail section showing the details of construction of the switch point and the support therefor.

Referring to these figures, 2 designates the main rails of a track and 3 a pair of rails turning out therefrom, either to form a siding or to extend in another direction.

4 designates a switch point which is pivoted at 4ª, and which is adapted to be moved into contact with one of the rails 2 or out of contact therewith. When moved into contact with one of the rails 2, it will be obvious that a car will be guided from the main track on to the side track, or vice versa, depending on circumstances.

5 designates a main trolley wire and 6 designates the side trolley wire, both of these wires being supported as is usual in railroad construction. Mounted on a post 7, or other supporting standard situated at the side of the track, is the outwardly extending arm 8 formed with the oppositely disposed parallel guides 9 which extend across the wires 5 and 6, the wire 5 passing beneath the guides 9 while the wire 6 passes above the guides. Each of the guides 9 is provided with a longitudinal slot 10. The main trolley wire has attached thereto a pair of slides 11 which extend up on each side of the guides 9, and which are mounted to move along the outer faces of the guides 9, and to be held in adjusted position by means of a set screw 12. By this arrangement the main wire 5 and the guides 9 may be held in any adjusted position relative to the other.

Pivoted to the side trolley wire 6 is the switch arm or point 13 which carries at its extremity the plate 14, usually to be found in trolley switches. The upper edge of this plate is supported by means of a hanger 15 upon a transversely extending rod 16, the ends of which extend into the slots 10 in the guides 9, thus providing means whereby the rod 16 may travel in the slots 10.

Mounted beside the track in any suitable situation is the switch stand 17 having the usual table 18 and an upwardly projecting rotatable mast 19. The lower end of the rotatable mast is connected by a crank or other suitable device 20 to a switch rod 21 which connects to the switch point 4, while the upper end of the mast 19 is eccentrically connected to a rod 22 which at its end is bifurcated as at 23 and connected to the plate 15, the bifurcated portion 23 of the rod arching over the connection to the transverse rod 16. This rod 23 is insulated from the plate 15 in any suitable manner as by an insulation 24 placed between the plate and the rod. We do not wish to be limited, however, to any manner of insulating these parts.

While we may connect the switch rod 22 to the mast 19 in any suitable manner which will provide for the reciprocation of the rod 22 upon a rotation of the mast, we have shown for this purpose the mast 19 as being formed with a square head 25, one corner of which is provided with a pin to which the rod 22 is connected. The table 18 of the switch stand is of course provided with two sets of notches 26, and the mast is provided with an operating arm 27 having the handle 28 pivoted thereto. When the handle is in a vertical position it engages with one or the other of the notches 26, thus holding the switch in any adjusted position, while when the handle is raised it is released from the notches and the mast may be turned. By loosening the set screws 12 it is possible to adjust the slides 11 along the guide arms 9, thus permitting the wire 5 to be kept in proper alinement at all times, even though the uprights supporting the arm 8, or the arm 8 itself should sag, or in any other way get out of position.

The operation of our invention is obvious. When it is desired to shift the car from one line to the other, the handle 28 of the switch stand is operated, which through the mast 19 and the connections therefrom to the switch points, will act to throw the switch point 4 and the switch point 13 from one side to the other. It will be seen that when the switch points are thrown to their closed position that the plate 14 will be carried into close proximity to the live wire 5, and that the trolley wheel will be carried into contact with the lower edge of the plate 14, and thereby shifted off to the arm 13 and thence to the side wire 6, while at the same time the trolley car wheels will engage with the switch point 4 and the car will move on to the side track. It is of course obvious that the car will be shifted either from the side track to the main track, or from the main track to the side track, as desired. In order to avoid the necessity of having a comparatively long switch point 13 for the side wire, we preferably hold the side wire 6 into a position relatively adjacent to the main live wire 5, as by means of the brace 29 which extends out from the support. We do not, however, wish to limit ourselves to this as it is obvious that many arrangements might be made to accomplish the same end. Neither do we wish to be limited to the exact details of construction and arrangement of parts, as it is obvious that many changes might be made without departing from the spirit of the invention.

What we claim is:

1. In a switch for trolley cars, the combination with a main feed wire and a branch feed wire, of parallel supporting members extending transversely over the main feed wire and upon which the main feed wire is supported, said supporting members being spaced apart, a trolley wheel switch point pivotally connected to the branch feed wire, the free end thereof being depressed below the level of the main feed wire, a hanger having a transversely extending rod movable upon said supporting members, said hanger extending down and between the supporting members to a point below the level of the main feed wire, the free end of the switch point being attached to said hanger and being thereby movable into or out of a position beneath the main feed wire.

2. In a switch for trolley cars, a main feed wire and a branch feed wire, a support extending transversely over the main feed wire and to which the main feed wire is attached, said support being formed with parallel guides extending transversely of the main feed wire, a trolley wheel switch point pivoted to the branch feed wire, the free end thereof extending beneath said support, a hanger having a transversely extending rod engaged in said guides and extending beneath the main feed wire and to which the switch point is attached, and means for shifting said hanger to bring the free end of the switch point into or out of alinement with the main feed wire.

3. In a switch for trolley cars, a main feed wire, a branch feed wire, a standard, an arm extending out from the standard having a bifurcated end extending over the main feed wire, said bifurcated end of the arm being formed with longitudinally extending guide slots, means for engaging the main feed wire with said arm, said means being adjustable along the arm, a trolley wheel switch point pivoted to the branch feed wire at one end and having its free end extending beneath the bifurcated portion of the arm, a hanger attached to the free end of the switch point and extending up between the two parts of the bifurcated arm, a transversely extending rod resting in the guide slots of said bifurcated portion of the arm, and means for shifting said hanger to shift the switch point into or out of alinement with the main feed wire.

4. In a switch for trolley cars, a main feed wire, a branch feed wire, a standard, an arm extending out from the standard having oppositely disposed spaced guiding members extending over the main feed wire transversely thereto, clamping devices adjustable along said guides and engaging the main feed wire, a trolley wheel switch point pivoted to the branch feed wire at one end having its free end extending beneath the said guides, a hanger transversely shiftable upon the guides and attached to the free end of the trolley wheel switch point, and means for shifting said hanger to bring the point into or out of alinement with the main feed wire.

5. In a switch for trolley cars, a main feed wire, a branch feed wire, an arm extending over the main feed wire and having a bifurcated end, said bifurcated end of the arm being formed with longitudinally extending guide slots, clips engaging over said forks of the arm and attached to the main feed wire, said clips being adjustable along the forks of the arm and being provided with means whereby they may be held in their adjusted position, a trolley wheel switch point pivoted to the branch feed wire at one end and having its free end extending beneath the bifurcated portion of the arm, a hanger attached to the free end of the trolley switch point and extending up between the two parts of the bifurcated arm, a transversely extending rod resting in the slots of said arm and shiftable therein, and means for shifting the switch point to bring the free end of the point into or out of alinement with the main feed wire.

6. In a switch for trolley cars, a main wire and a branch feed wire, an overhead support extending transversely over the main feed wire, a switch point pivoted to the branch feed wire, the end of said switch point being depressed below the level of the main feed wire and extending beneath said support, and a hanger shiftable upon said support, said hanger being composed of a strip of sheet metal extending downward to a point below the level of the main feed wire, then being bent upon itself and extending upward and outward, the free end of the switch point being received in the fold thus formed, the folded portion of the hanger forming a continuation of the switch point and being rounded, and means whereby the hanger may be laterally shifted to shift the switch point.

In testimony whereof, we affix our signatures in presence of two witnesses.

LEE RADCLIFF. [L. S.]
   EDGAR E. KILBY. [L. S.]

Witnesses:
 C. S. NELSON,
 LESLIE R. PORTER.

---

Copies of this patent may be obtained for five cents each, by addressing the "Commissioner of Patents Washington, D. C."